(12) United States Patent
Guru Prasad

(10) Patent No.: US 9,073,273 B2
(45) Date of Patent: Jul. 7, 2015

(54) METHOD OF MANUFACTURING AN OBLONG SHELL PART AND SUCH SHELL PART

(75) Inventor: Hanumantha Jois Guru Prasad, Kolding (DK)

(73) Assignee: LM Wind Power A/S, Kolding (DK)

( * ) Notice: Subject to any disclaimer, the term of this patent is extended or adjusted under 35 U.S.C. 154(b) by 597 days.

(21) Appl. No.: 13/524,893

(22) Filed: Jun. 15, 2012

(65) Prior Publication Data

US 2012/0321480 A1 Dec. 20, 2012

(30) Foreign Application Priority Data

Jun. 17, 2011 (EP) .................................. 11170311

(51) Int. Cl.
| | |
|---|---|
| B29C 70/48 | (2006.01) |
| B29C 70/54 | (2006.01) |
| B29C 70/44 | (2006.01) |
| B29L 31/08 | (2006.01) |

(52) U.S. Cl.
CPC ....... B29C 70/547 (2013.01); *Y10T 428/24504* (2015.01); B29C 70/443 (2013.01); B29C 70/48 (2013.01); *B29L 2031/082* (2013.01); *Y02E 10/721* (2013.01)

(58) Field of Classification Search
CPC .... B29C 70/547; B29C 70/443; B29C 70/48; F03D 1/0675; F05B 2280/6003; Y10T 428/24504; B29L 2031/082; Y02E 10/721

USPC .......................................................... 416/230
See application file for complete search history.

(56) References Cited

U.S. PATENT DOCUMENTS

| | | | | |
|---|---|---|---|---|
| 7,892,467 | B2 * | 2/2011 | Kofoed et al. | 264/101 |
| 8,221,666 | B2 * | 7/2012 | Mikkelsen et al. | 264/257 |
| 8,440,120 | B2 * | 5/2013 | Mikkelsen et al. | 264/102 |
| 2009/0051076 | A1 * | 2/2009 | Kofoed et al. | 264/258 |
| 2010/0189973 | A1 * | 7/2010 | Mikkelsen et al. | 428/213 |
| 2010/0209651 | A1 * | 8/2010 | Mikkelsen et al. | 428/56 |
| 2011/0164987 | A1 * | 7/2011 | Grabau | 416/230 |
| 2012/0007269 | A1 * | 1/2012 | Olesen et al. | 264/101 |
| 2012/0067515 | A1 * | 3/2012 | Dahl et al. | 156/245 |
| 2012/0257984 | A1 * | 10/2012 | Frederiksen | 416/232 |

* cited by examiner

*Primary Examiner* — Nathaniel Wiehe
*Assistant Examiner* — Eldon Brockman
(74) *Attorney, Agent, or Firm* — Nath, Goldberg & Meyer; Jerald L. Meyer

(57) ABSTRACT

A plurality of fiber layers is stacked to form a fiber insertion extending in a longitudinal direction of the shell part to be manufactured, whereby a core element having a tapered edge section is arranged along the fiber insertion. The fiber layers are stacked so that the tapered edge section of the core element is wedged into the fiber insertion. The core element is composed by a first and a second core part that are arranged along each other. The first core part forms at least part of the tapered edge section of the core element. The surface of the first core part has a higher permeability to liquid polymer than that of the surface of the second core part so that, during infusion, liquid polymer penetrates the surface of the first core part more readily than it penetrates the surface of the second core part.

15 Claims, 4 Drawing Sheets

METHOD OF MANUFACTURING AN OBLONG SHELL PART AND SUCH SHELL PART

Figure 1:
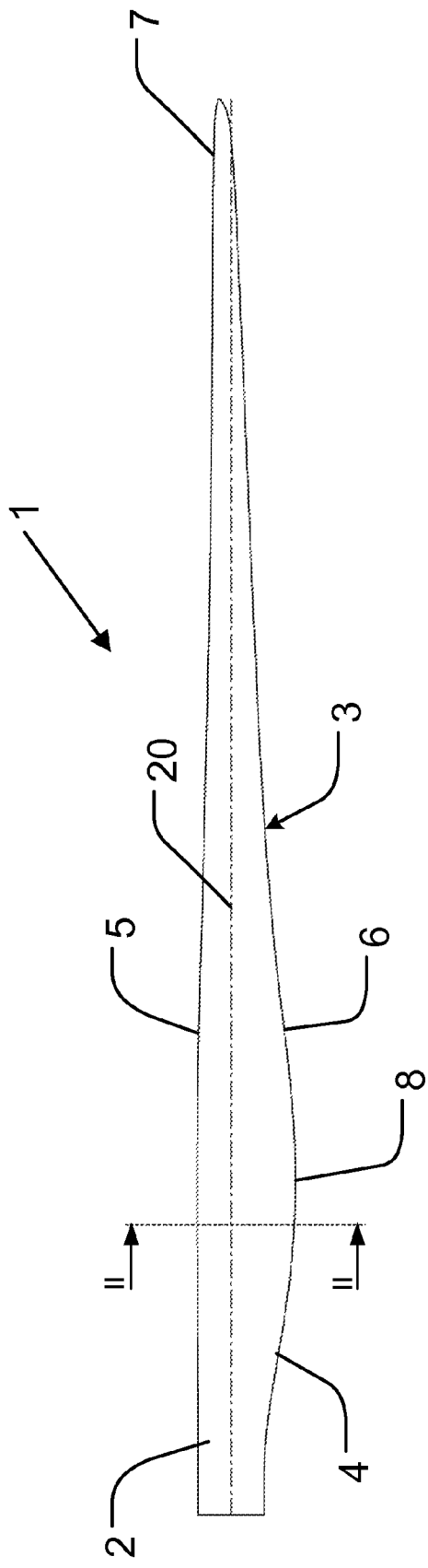

This is a Non-Provisional Application, filed Jun. 15, 2012, an application claiming the benefit under 35 U.S.C. 119(b) from European Patent Application No. 11170311.2, filed on Jun. 17, 2011, the content of which is hereby incorporated by reference in its entirety.

The present invention relates to a method of manufacturing an oblong shell part comprising a fibre-reinforced polymer material by means of an infusion process, whereby fibre material is arranged in a mould cavity and subsequently impregnated with liquid polymer, whereby a plurality of fibre layers is stacked to form a fibre insertion, which in a finished shell part constitute a load carrying structure, such as a main laminate, extending in a longitudinal direction of the shell part to be manufactured, whereby at least one core element is arranged along at least part of the fibre insertion, the at least one core element having a tapered edge section and comprising flow channels for liquid polymer, whereby the plurality of fibre layers to form the fibre insertion is stacked so that the tapered edge section of the at least one core element is wedged in between the fibre layers and thereby into the fibre insertion, whereby liquid polymer is infused into the mould cavity, so that it propagates through the stacked fibre layers and into the flow channels of the at least one core element.

WO 2009/003477 A1 discloses a method for producing a composite structure, whereby a main laminate and a core element are arranged along each other. The core element may for instance comprise blocks of balsa or foamed PVC forming flow channels for liquid polymer between the blocks.

WO 2006/058540 and WO 2007/098769 similarly disclose methods for producing a composite structure.

In a polymer infusion process for producing a fibre-reinforced polymer material, it is of utmost importance that the fibre material is properly impregnated throughout the finished product in order to obtain the required strength. If a change in the polymer or resin content of the reinforced fibre material occurs from one position to another throughout the finished product, this change of properties of the product may due to the so-called notch effect result in a weak point in the product.

In a transition area between fibre layers forming a fibre insertion and a core element, a gradual transition may be achieved in that a tapered edge section of the core element is wedged into the fibre insertion. However, during polymer infusion, the flow of liquid polymer propagating through the stacked fibre layers may speed up in the transition area, as the cross-sectional area of the porous fibre material is reduced over the tapered edge section of the core element. As a result, liquid polymer may race track into flow channels of the tapered edge section of the core element, thereby creating a slightly reduced polymer content of the finished reinforced fibre material at the entrance of such flow channels as compared to other areas of the finished shell part. This change of properties of the product may, as explained above, due to the so-called notch effect, result in a weak point in the product. Such weak points may, under certain circumstances be visible on a finished product in the form of white stripes in the surface.

The object of the present invention is to reduce the risk of weak points occurring in a finished shell part.

In view of this object, the at least one core element is composed by a first core part and a second core part that are arranged along each other (e.g. juxtaposed) in the longitudinal direction of the shell part to be manufactured so that the first core part is arranged between the second core part and a centre line of the fibre insertion, by that the first core part forms at least part of the tapered edge section of the core element, and by that the surface of the first core part has a higher permeability to liquid polymer than that of the surface of the second core part so that, during infusion, liquid polymer penetrates the surface of the first core part more readily than it penetrates the surface of the second core part.

In this way, as the surface of the first core part has a relatively higher permeability to liquid polymer, the flow of liquid polymer into the surface of the first core part may be more evenly distributed over the surface area, so that the phenomenon of race tracking into certain and possibly distinct flow channels of the first core part may be substantially reduced or eliminated, thereby substantially reducing or eliminating the risk of weak points in a finished shell part.

During infusion of liquid polymer, polymer flows in the direction from the fibre insertion to the second core part so that it passes the first core part on its way to the second core part. As explained above, during polymer infusion, the flow of liquid polymer propagating through the stacked fibre layers may speed up in the transition area, as the cross-sectional area of the porous fibre material is reduced over the tapered edge section of the core element. This effect may be further enhanced if polymer flows in the direction from the fibre insertion to the second core part, and consequently it may be of even further advantage that the surface of the first core part has a higher permeability to liquid polymer than that of the surface of the second core part, in terms of reducing the risk of areas under saturated with hardened polymer in a finished shell part. In other words, the infusion and consequently also the resin inlet channels are arranged so that resin propagates from the fibre insertion to the first core part and on towards the second core part.

In other words, the method according to the invention of manufacturing an oblong shell part comprising a fibre-reinforced polymer material by means of an infusion process comprises the following steps:

a) arranging fibre material in a mould cavity and subsequently impregnated it with liquid polymer, whereby a plurality of fibre layers is stacked to form a fibre insertion, which in a finished shell part constitute a load carrying structure, such as a main laminate, extending in a longitudinal direction of the shell part to be manufactured, b) arranging the least one core element along at least part of the fibre insertion, the at least one core element having a tapered edge section and comprising flow channels for liquid polymer, c) stacking the plurality of fibre layers to form the fibre insertion so that the tapered edge section of the at least one core element is wedged in between the fibre layers and thereby into the fibre insertion, d) infusing liquid polymer into the mould cavity so that it propagates through the stacked fibre layers and into the flow channels of the at least one core element, e) composing the at least one core element by a first core part and a second core part by arranging the first core part and the second core part along each other in the longitudinal direction of the shell part to be manufactured so that the first core part is arranged between the second core part and a centre line of the fibre insertion, whereby the first core part forms at least part of the tapered edge section of the core element, and the surface of the first core part has a higher permeability to liquid polymer than that of the surface of the second core part so that, during infusion, liquid polymer penetrates the surface of the first core part more readily than it penetrates the surface of the second core part.

Accordingly, it is seen that the resin inlet channels are arranged near the centre line or above a central portion of the fibre insertion so that the resin propagates from the centre of the fibre insertion and towards the first core part and then onto the second core part.

In an embodiment, the first core part and the second core part are made of the same type of material, and the surface of the first core part has a higher permeability to liquid polymer than that of the surface of the second core part because the surface of the second core part has been coated with a substance closing at least some of the pores of the material at its surface.

In an embodiment, the flow channels of the core element extend only in the second core part and not in the first core part. Thereby, the flow of liquid polymer into the surface of the first core part may be even more evenly distributed over the surface area, as the liquid polymer may flow through pores of the material of the first core part but not through flow channels of the first core part, so that the phenomenon of race tracking into certain flow channels of the first core part may be substantially eliminated, thereby even better reducing the risk of weak points in a finished shell part.

In an embodiment, the flow channels of the at least one core element have the form of straight channels.

In an embodiment, the flow channels of the at least one core element have been cut, drilled or otherwise formed by chip removal.

In an embodiment, flow channels of the core element are formed between blocks forming at least part of the core element.

In an embodiment, the first core part is made of a first core material and the second core part is made of a second core material, whereby the first core material has a higher permeability to liquid polymer than that of the second core material so that, during infusion, liquid polymer penetrates the first core material more readily than it penetrates the second core material. Thereby, the flow of liquid polymer into the surface of the first core part may be even more evenly distributed over the surface area, as the liquid polymer may more evenly penetrate the entire first core part.

In an embodiment, the first core material is foamed polymer, and the second core material is balsa wood. Foamed polymer may in general have a higher permeability to liquid polymer than that of balsa wood, and this combination may be advantageous also in terms of costs, as balsa wood may be relatively cheaper than foamed polymer. The first core part will typically be substantially smaller than the second core part, so that a higher cost of the foamed polymer will make a relatively small impact on the overall costs. Furthermore, it may be advantageous to avoid balsa wood in the transition area, as humidity and fungus in the balsa wood under some circumstances, especially in the transition area, due to elevated temperatures, such as 150 degrees Celsius, may cause air bubbles during infusion of polymer which may result in delamination. Furthermore, the risk of balsa chips falling into the fibre insertion may be avoided.

The first core material may be foamed polymer of open cell type, whereby a suitable permeability throughout the entire material may be ensured without the need for supplementary channels formed in the material, for instance by cutting or drilling.

The first core material may be foamed polymer of open cell type, such as PVC H80.

The second core material may be balsa wood that is surface coated to reduce permeability in order to avoid penetration of resin into the core material and thereby increasing the amount of resin in the final product.

In an embodiment, the first core material is foamed polymer of open cell type, and the second core material is balsa wood that is surface coated to reduce permeability.

In an embodiment, the first core material is foamed polymer of open cell type, and the second core material is foamed polymer of closed cell type. Foamed polymer of open cell type may in general have a higher permeability to liquid polymer than that of foamed polymer of closed cell type.

The invention furthermore relates to a method of manufacturing a wind turbine blade by assembling two oblong shell parts manufactured as described above.

The present invention further relates to an oblong shell part comprising a fibre-reinforced polymer material manufactured by means of an infusion process, whereby fibre material has been arranged in a mould cavity and subsequently impregnated with liquid polymer, wherein the oblong shell part comprises a plurality of fibre layers stacked to form a fibre insertion constituting a load carrying structure, such as a main laminate, extending in a longitudinal direction of the shell part, and at least one core element arranged along at least part of the fibre insertion, the at least one core element having a tapered edge section and comprising flow channels comprising hardened polymer, wherein the plurality of fibre layers forming the fibre insertion is stacked so that the tapered edge section of the at least one core element is wedged in between the fibre layers and thereby into the fibre insertion, wherein the stacked fibre layers and the flow channels of the at least one core element is at least partly filled with hardened polymer.

The oblong shell part is characterised in that the at least one core element is composed by a first core part and a second core part arranged along each other in the longitudinal direction of the shell part so that the first core part is arranged between the second core part and a centre line of the fibre insertion, in that the first core part forms at least part of the tapered edge section of the core element, and in that a surface layer of the first core part has a higher content of hardened polymer taken up by pores of the surface layer than the content of hardened polymer of a surface layer of the second core part. Thereby, the above described properties may be achieved, wherein the polymer contents is increased near the first core part, thus decreasing the probability of weak points due to the notch effect.

In an embodiment, the flow channels of the core element extend only in the second core part and not in the first core part. Thereby, the above described properties may be achieved.

In an embodiment, flow channels of the core element are formed between blocks forming at least part of the core element. Thereby, the above described properties may be achieved.

In an embodiment, the first core part is made of a first core material and the second core part is made of a second core material, wherein the first core material has a higher content of hardened polymer taken up by pores of the core material than the content of hardened polymer of the second core material. Thereby, the above described properties may be achieved.

In an embodiment, the first core material is foamed polymer, possibly of open cell type, and the second core material is balsa wood, possibly surface coated so that the content of hardened polymer taken up by the balsa wood is reduced. Thereby, the above described properties may be achieved.

In an embodiment, when seen in a cross-section perpendicular to the longitudinal direction of the shell part, said cross-section being located at the position where the oblong shell part has its largest width, the width of the first core part is at least 1/20, preferably at least 1/15, and most preferred at least 1/12 of the width of the second core part. Thereby, a suitable transition area may be achieved.

The invention furthermore relates to a wind turbine blade comprising two oblong shell parts as described above.

Figure 2:
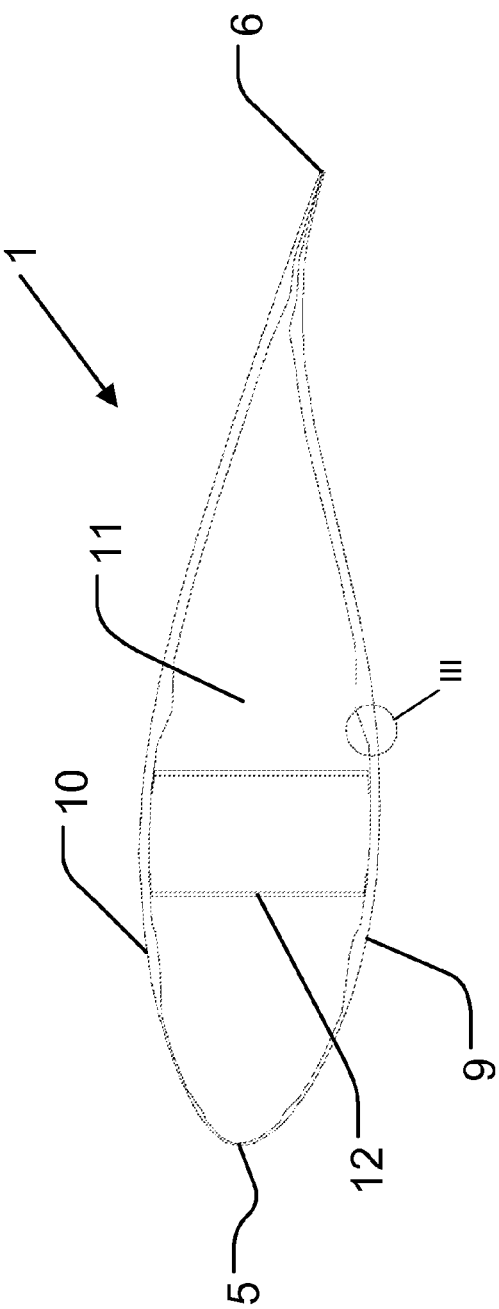
Figure 3:
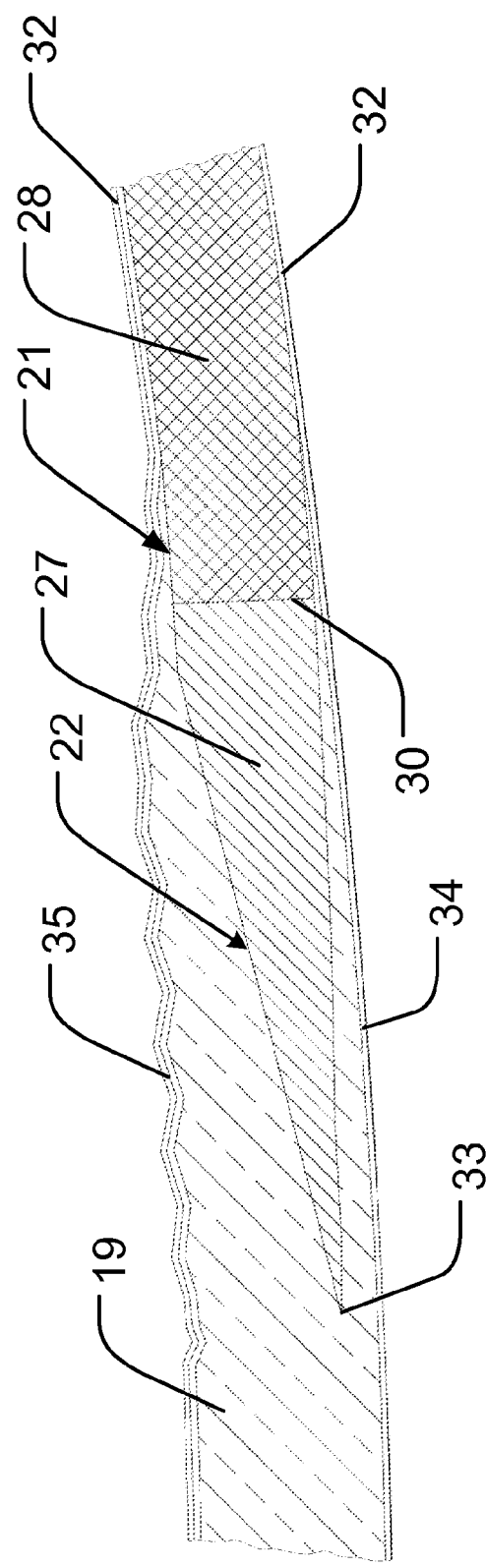
Figure 4:
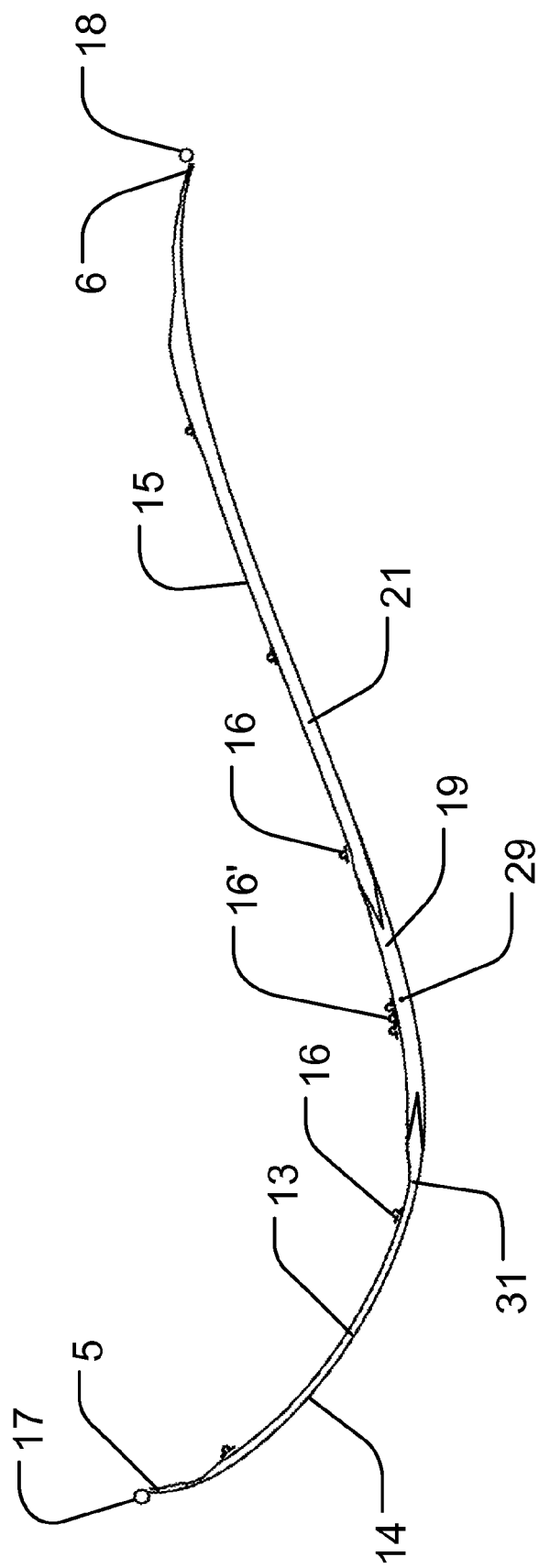
Figure 5:
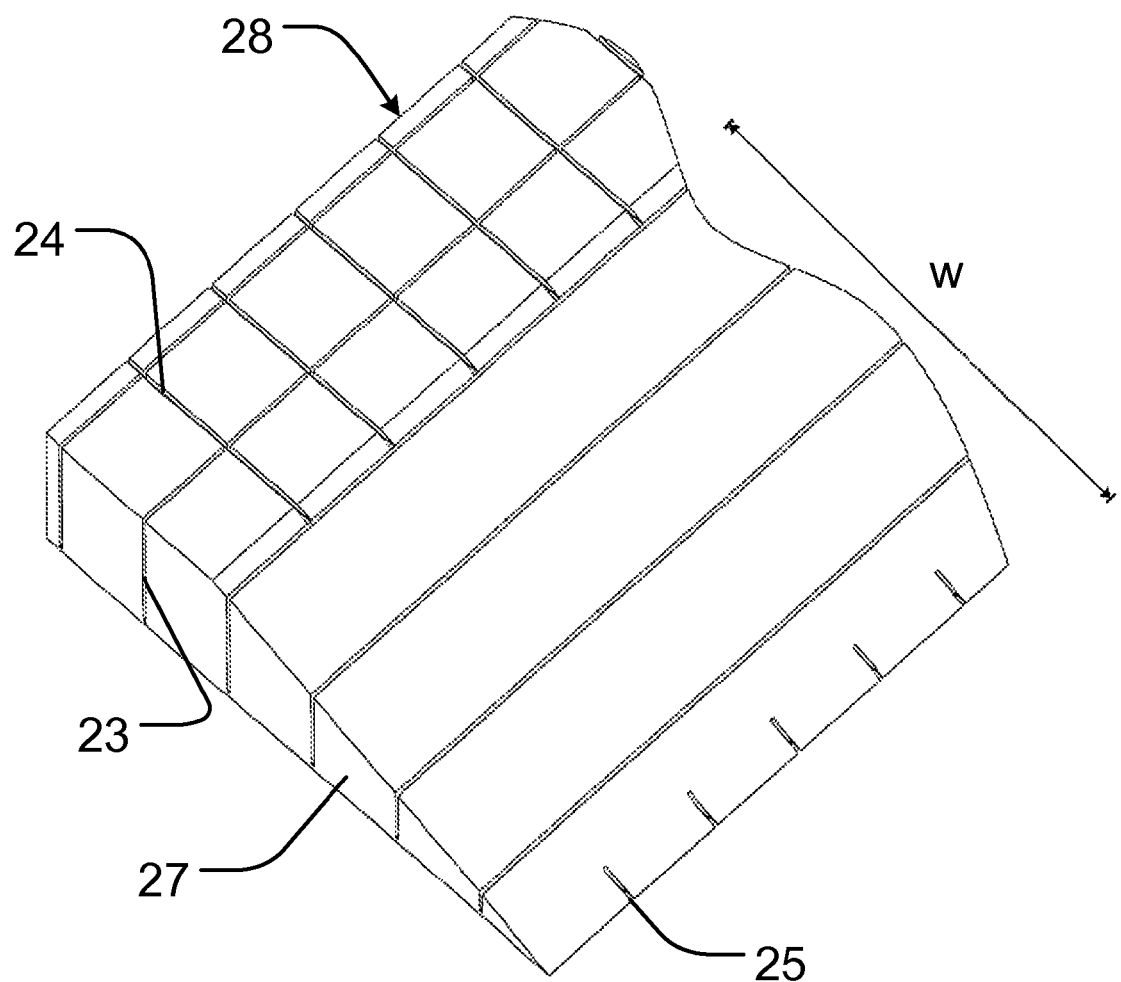

The invention will now be explained in more detail below by means of examples of embodiments with reference to the very schematic drawing, in which FIG. 1 is a top view of a wind turbine blade;
FIG. 2 is a cross-section along the line II-II of FIG. 1;
FIG. 3 is a detail of FIG. 2 on a larger scale;
FIG. 4 is a cross-section of a mould during production of a wind turbine blade; and
FIG. 5 is a perspective view of a core element.

FIG. 1 shows a view of a wind turbine blade 1. The wind turbine blade 1 has the shape of a conventional wind turbine blade and comprises a root region 2 closest to the not shown hub on which the wind turbine blade is to be mounted, a tip region 7 furthest away from the hub, a profiled or an airfoil region 3 between the root region 2 and the tip region 7 and a transition region 4 between the root region 2 and the air-foil region 3. The blade 1 comprises a leading edge 5 facing the direction of rotation of the blade 1, when the blade is mounted on the hub, and a trailing edge 6 facing the opposite direction of the leading edge 5.

The airfoil region 3 (also called the profiled region) has an ideal or almost ideal blade shape with respect to generating lift, whereas the root region 2 due to structural considerations has a substantially circular or elliptical cross-section, which for instance makes it easier and safer to mount the blade 1 to the hub. The diameter (or the chord) of the root region 2 may be constant along the entire root region. The transition region 4 has a transitional profile gradually changing from the circular or elliptical shape of the root region 2 to the airfoil profile of the airfoil region 3. The chord length of the transition region 4 typically increases with increasing distance from the hub. The airfoil region 3 has an airfoil profile with a chord extending between the leading edge 5 and the trailing edge 6 of the blade 1. The width of the chord decreases with increasing distance from the hub.

A shoulder 8 of the blade 1 is defined as the position, where the blade 1 has its largest chord length. The shoulder 8 is typically provided at the boundary between the transition region 4 and the airfoil region 3.

FIG. 2 shows a cross-section though the wind turbine blade 1 of FIG. 1 along the line II-II situated approximately at the shoulder 8. It is seen that the wind turbine blade 1 is composed by a first oblong shell part 9 and a second oblong shell part 10 which are bonded together at the leading edge 5 and at the trailing edge 6, respectively, of the wind turbine blade 1, thereby forming an internal cavity 11. Furthermore, the first and second oblong shell parts 9, 10 are connected internally by means of longitudinally extending reinforcement elements 12, such as beams or webs, which are aligned within the shell parts of the wind turbine blade and bonded to the shell parts.

The first and second oblong shell parts 9, 10 comprise a fibre-reinforced polymer material produced by means of an infusion process, such as vacuum infusion or VARTM (Vacuum Assisted Resin Transfer Moulding). During the manufacturing process, liquid polymer, also called resin, is filled into a mould cavity, in which fibre material priorly has been inserted, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the first mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

FIG. 4 illustrates very schematically an embodiment of the method of manufacturing one of the oblong shell parts 9, 10 of the wind turbine blade 1 shown in FIGS. 1 and 2, whereby fibre material is placed in a mould cavity 13 of a first rigid mould part 14 and covered by a resilient vacuum bag 15 provided with Ω-formed inlet channels 16, 16' and vacuum channels 17, 18. It is noted that a first vacuum channel 17 is placed at the position corresponding to the leading edge 5 of the finished blade, and a second vacuum channel 18 is placed at the position corresponding to the trailing edge 6 of the finished blade. Furthermore, it is noted that a group of Ω-formed inlet channels 16' are positioned above a fibre insertion 19, which in the finished shell part constitute a load carrying structure in the form of a main laminate. Additional Ω-formed inlet channels 16 are placed at different positions at either side of the group of Ω-formed inlet channels 16'.

During the process of filling the mould, a vacuum, which in this connection is understood as an under pressure or negative pressure relative to the surrounding pressure, is generated via the vacuum channels 17, 18 in the mould cavity 13, whereby liquid polymer is drawn into the mould cavity via the inlet channels 16, 16' in order to fill said mould cavity.

From the inlet channels 16, 16' the polymer disperses in all directions in the mould cavity 13 due to the negative pressure as flow front move towards the vacuum channels 17, 18. In the embodiment shown in FIG. 4, it is understood that the polymer generally disperses in the directions from the area of the fibre insertion 19 to the areas of the leading edge 5 and the trailing edge 6, respectively, of the finished blade 1. Numerous other configurations of inlet channels and vacuum channels falling within the scope of the invention as defined by the claims are conceivable.

It is important to position the inlet channels 16, 16' and the vacuum channels 17, 18 optimally in order to obtain a complete filling of the mould cavity. Ensuring a complete distribution of the polymer in the entire mould cavity is, however, often difficult, and accordingly this may sometimes result in so-called dry spots, i.e. areas with fibre material not being sufficiently impregnated with resin. Such areas where the fibre material is not impregnated sufficiently, and where there can be air pockets, may be difficult or impossible to avoid by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff has to stand on the vacuum bag. This is not desirable, especially not when the polymer has not hardened, as it can result in deformations in the inserted fibre material and thus in a local weakening of the structure, which can cause for instance buckling effects.

In order to produce one of the oblong shell parts 9, 10 of the wind turbine blade 1 shown in FIGS. 1 and 2, as illustrated in FIG. 4, firstly, fibre material is arranged in the mould cavity 13. A plurality of fibre layers is stacked to form the fibre insertion 19, which in a finished shell part constitute a load carrying structure, such as a main laminate, which extends in a longitudinal direction of the shell part 1 to be manufactured, as indicated by the line 20 in FIG. 1. A core element 21 is arranged along at least part of the fibre insertion 19 in the longitudinal direction of the shell part 1 and has a tapered edge section 22, as illustrated in FIG. 3 showing the detail III of FIG. 2. The core element 21 comprises flow channels 23, 24, 25, 26 for the distribution of liquid polymer throughout the mould cavity 13. The plurality of fibre layers forming the fibre insertion 19 is stacked so that the tapered edge section 22 of the core element 21 is wedged in between the fibre layers and thereby into the fibre insertion 19. Thereby, a gradual transition between the fibre layers forming the fibre insertion 19 and the core element 21 may be achieved, whereby an abrupt change in properties of the finished shell part 1 and there from resulting weak areas may be avoided. Following the laying out of fibre material and arranging the core element 21, as described above, liquid polymer is infused into the mould cavity 13, so that it propagates through the stacked fibre layers and into the flow channels 23, 24, 25, 26 of the core element 21. A tip 33 of the tapered edge section 22 may be located slightly nearer an outside 34 of the fibre insertion 19 than an inside 35 of the fibre insertion 19, i.e. nearer an outer surface than an inner surface of the blade shell.

According to the present invention, the core element 21 is composed by a first core part 27 and a second core part 28 arranged along each other in the longitudinal direction of the shell part 1 to be manufactured. Thereby, the first core part 27 is arranged between the second core part 28 and a centre line 29 of the fibre insertion 19, as indicated in FIG. 4. Thereby, polymer flows in the direction from the fibre insertion 19 to the second core part 28 so that it passes the first core part 27 on its way to the second core part 28.

The first core part 27 forms at least part of the tapered edge section 22 of the core element 21. Furthermore, according to the present invention, the surface of the first core part 27 has a higher permeability to liquid polymer than that of the surface of the second core part 28 so that, during infusion, liquid polymer penetrates the surface of the first core part 27 more readily than it penetrates the surface of the second core part 28. Thereby, the flow of liquid polymer into the surface of the first core part 27 may be more evenly distributed over the surface area, so that the phenomenon of race tracking into certain flow channels of the first core part 27 may be substantially reduced, thereby reducing the risk of weak points in a finished shell part 1.

It may be achieved that the surface of the first core part 27 has a higher permeability to liquid polymer than that of the surface of the second core part 28 by providing the first core part 27 with a surface layer that has a higher permeability to liquid polymer than that of a surface layer of the second core part 28. Thereby, in the finished shell part, the content of hardened polymer taken up by pores of the surface layer of the first core part 27 may be higher than the content of hardened polymer of the surface layer of the second core part 28. Said surface layer of the first core part 27 with a higher permeability to liquid polymer than that of a surface layer of the second core part 28 may be provided on surfaces of a block of material having flow channels formed therein for the distribution of liquid polymer throughout the first core part 27.

The first core part 27 may constitute a part of the tapered edge section 22 of the core element 21, whereby the second core part 28 may constitute the remaining part of the tapered edge section 22. Alternatively, the first core part 27 may constitute the entire tapered edge section 22 of the core element 21 and even also a part of a non-tapering section of the core element 21. It will be evident to the person skilled in the art that many configurations are possible within the scope of the invention. For instance, in the embodiment illustrated in FIG. 3, the first core part 27 and the second core part 28 are separated by a line 30 positioned somewhere in between a clearly tapering section and a section of substantially non-tapering form.

The entire core element 21 is covered with a fibre reinforced material, such as one or more fibre reinforced polymer layers 32, i.e. an inner and outer skin, see FIG. 3. The core material may be used as a spacer between such layers to form a sandwich structure and is typically made of a rigid, light-weight material in order to reduce the weight of the composite structure. In order to ensure an efficient distribution of the liquid polymer during the impregnation process, the core element is provided with a resin distribution network in the form of the flow channels 23, 24, 25, 26, as illustrated in FIG. 3. The flow channels of the core element may be formed between blocks forming at least part of the core element, as illustrated in FIG. 5. Said blocks may be provided adhered on a web or scrim, for instance a fibre layer, so that they are easily arranged in the mould 14 and easily adapt or conform to the form of the mould cavity 13.

However, in an embodiment, the flow channels 23, 24 of the core element 21 extend only in the second core part 28 and not in the first core part 27. Thereby, the liquid polymer may flow through pores of the material of the first core part 27 but not through flow channels of the first core part 27, so that the phenomenon of race tracking into certain flow channels of the first core part may be substantially eliminated, thereby even better reducing the risk of weak points in a finished shell part. During polymer infusion, the flow of liquid polymer propagating through the stacked fibre layers may speed up in the transition area, as the cross-sectional area of the porous fibre material is reduced over the tapered edge section of the core element. This could under certain circumstanced cause liquid polymer to race track into possible flow channels of the tapered edge section of the core element, thereby creating a slightly reduced polymer content of the finished reinforced fibre material at the entrance of such flow channels as compared to other areas of the finished shell part. However, as the liquid polymer reaches a substantially non-tapering part of the core element 21, that is, in the embodiment shown in FIG. 3, more or less the second core part 28, the cross-sectional area of the relatively thin layer of porous fibre material placed on the top and bottom side of the core element 21 in order to form the fibre reinforced polymer layers 32 is relatively constant in the direction of flow directed against the right vacuum channel 18, and consequently the flow speed is relatively constant and therefore may typically not give rise to the phenomenon of race tracking into flow channels of the second core part 28.

The first core part 27 may be made of a first core material and the second core part 28 may be made of a second core material, whereby the first core material has a higher permeability to liquid polymer than that of the second core material so that, during infusion, liquid polymer penetrates the first core material more readily than it penetrates the second core material. Thereby, in the finished shell part, the first core material may have a higher content of hardened polymer taken up by pores of the core material than the content of hardened polymer of the second core material.

The first core material may for instance be foamed polymer of open cell type, such as PVC H80, and the second core material may be balsa wood, whereby it may be achieved that the first core material has a higher permeability to liquid polymer than that of the second core material. The balsa may typically be surface coated to reduce permeability in order to avoid penetration of resin into the core material of the second core part 28 which may typically be substantially larger than the first core part 27. Thereby, the weight of the final product may be reduced.

The first core material may for instance be foamed polymer of closed cell type, and the second core material may be balsa wood, whereby it may be achieved that at least a surface layer of the first core material has a higher permeability to liquid polymer than that of the second core material. Possibly only a part of the first core part 27 located under a surface layer may be provided with flow channels formed in the material in order to improve the distribution of liquid resin through the first core part 27. Such channels may be bored into the first core part 27 from its sides or may be formed in a separate piece of material of closed cell foam that is subsequently provided with said surface layer of closed cell foam without flow channels. Alternatively, if flow channels are also preferred in the tapered surfaces of the first core part, flow channels may be formed through the tapered surfaces of the first core part as in the embodiment shown in FIG. 5.

It is noted that in the context of this description, a material described as being permeable to liquid polymer means a porous material, such as a material having pores or cavities in which polymer may be taken up generally throughout said material. Such pores or cavities may for instance be formed by foaming a material such as polymer or may be pores naturally existing in balsa wood, for instance. Consequently, said pores or cavities will typically be regularly spread out over the volume of the material. However, the density with which such pores or cavities exist in the material may very well vary over the volume of the material. It is noted, however, that the surface of a porous material generally permeable to liquid polymer may be surface treated, for instance by coating, so that the surface is relatively non-permeable to liquid polymer. Consequently, it is possibly to make the surface of a certain porous material more or less permeable to liquid polymer by means of appropriate surface treatment.

On the other hand, when this description refers to flow channels for liquid polymer in a core element, "flow channels" refer to channels distinctly formed in the material by cutting, drilling or any other type of suitable chip removal process or moulding process, as opposed to pores or cavities as described above. The flow channels may preferably have the form of straight channels, possibly interconnected. Furthermore, as described above, the flow channels of the core element may be formed between blocks forming at least part of the core element.

As an example, in prior art wind turbine blades, the phenomenon of liquid polymer race tracking into distinct flow channels during manufacturing may, in a finished wind turbine blade, result in a fibre content of approximately 72-73% and a resin content of approximately 27-28% at inlets of such flow channels, which may result in weak points. According to the present invention, on the contrary, there may for instance be obtained a fibre content of approximately 69-70% and a resin content of approximately 30-31% generally over the surface of the first core part, as the result of reducing or eliminating the phenomenon of liquid polymer race tracking.

When seen in a cross-section perpendicular to the longitudinal direction of the oblong shell part 9, 10, said cross-section being located at the position where the oblong shell part 9, 10 has its largest width, the width of the first core part 27 may be least $1/20$, preferably at least $1/15$, and most preferred at least $1/12$ of the width of the second core part 28. The width of the first core part 27 is in FIG. 5 denoted w; the width of the second core part 28 is not indicated in the figure, as only a part of the second core part 28 is illustrated. In a wind turbine blade 1, said cross-section may be located at the shoulder 8 of the blade 1. Purely as an example, in a wind turbine blade 1 having a length of 47.5 meters, the first core part 27 may have a width of approximately 15 cm and the second core part 28 may have a width of approximately 150 cm.

In the embodiment illustrated in FIG. 4, apart from the first core element 21 arranged to the right of the fibre insertion 19, a second core element 31 is arranged to the left of the fibre insertion 19. The composition of the second core element 31 may correspond to that of the first core element 21, but as indicated, the overall form of the second core element 31 is different from that of the first core element 21. First and second core parts of the second core element 31 may be arranged mirrored in relation to the first and second core parts of the first core element 21. However, as the invention is applicable to the manufacture of any oblong shell part comprising a fibre-reinforced polymer material by means of an infusion process, the core elements 21, 31 may have different forms than those indicated in FIG. 4. In the case of the manufacture of a wind turbine blade, the fibre insertion 19 may form a so-called main laminate, and for instance in the case of large wind turbine blades, the oblong shell parts produced may additionally to the fibre insertion 19 include an additional fibre insertion (not shown) forming a so-called small main laminate. Such an additional fibre insertion may be arranged along the fibre insertion 19, typically along a part of the length of the fibre insertion 19, and a third core element (not shown) may then be arranged between the fibre insertion 19 and the additional fibre insertion. The third core element may then comprise a tapered edge section at either side, so that it may be wedged into the fibre insertion 19 as well as into the additional fibre insertion The third core element may comprise a central core part and two side core parts, whereby the surface of the side core parts has a higher permeability to liquid polymer than that of the surface of the central core part. However, said central core part may also be left out.

Although the invention has been exemplified by means of a wind turbine blade composed by two oblong shell parts, the invention is equally applicable to the manufacturing of any other type of oblong shell part comprising a fibre-reinforced polymer material by means of an infusion process.

LIST OF REFERENCE NUMERALS 1 wind turbine blade
2 root region
3 airfoil region
4 transition region
5 leading edge
6 trailing edge
7 tip region
8 shoulder
9 first oblong shell part
10 second oblong shell part
11 internal cavity
12 reinforcement elements
13 mould cavity
14 rigid mould part 15 resilient vacuum bag
16, 16' Ω-formed inlet channels
17 first vacuum channel
18 second vacuum channel
19 fibre insertion
20 line
21 core element
22 tapered edge section
23, 24, 25, 26 flow channels
27 first core part
28 second core part
29 centre line
30 line
31 second core element
32 fibre reinforced polymer layers
33 tip of tapered edge section
34 outside of fibre insertion
35 inside of fibre insertion

The invention claimed is:

1. A method of manufacturing an oblong shell part comprising a fibre-reinforced polymer material by means of an infusion process, whereby fibre material is arranged in a mould cavity and subsequently impregnated with liquid polymer, whereby a plurality of fibre layers is stacked to form a fibre insertion, which in a finished shell part constitute a load carrying main laminate, extending in a longitudinal direction of the shell part to be manufactured, whereby at least one core element is arranged along at least part of the fibre insertion, the at least one core element having a tapered edge section and comprising flow channels for liquid polymer, whereby the plurality of fibre layers to form the fibre insertion is stacked so that the tapered edge section of the at least one core element is wedged in between the fibre layers and thereby into the fibre insertion, whereby liquid polymer is infused into the mould cavity so that it propagates through the stacked fibre layers and into the flow channels of the at least one core element, characterised by that the at least one core element is composed by a first core part and a second core part that are arranged along each other in the longitudinal direction of the shell part to be manufactured so that the first core part is arranged between the second core part and a centre line of the fibre insertion, by that the first core part forms at least part of the tapered edge section of the core element, and by that the surface of the first core part has a higher permeability to liquid polymer than that of the surface of the second core part so that, during infusion, liquid polymer penetrates the surface of the first core part more readily than it penetrates the surface of the second core part, and wherein, during infusion of liquid polymer, polymer flows in the direction from the fibre insertion to the second core part so that it passes the first core part on its way to the second core part.

2. A method according to claim 1, whereby the flow channels of the core element extends only in the second core part and not in the first core part.

3. A method according to claim 1, whereby flow channels of the core element are formed between blocks forming at least part of the core element.

4. A method according to claim 1, whereby the first core part is made of a first core material and the second core part is made of a second core material, whereby the first core material has a higher permeability to liquid polymer than that of the second core material so that, during infusion, liquid polymer penetrates the first core material more readily than it penetrates the second core material.

5. A method according to claim 4, whereby the first core material is foamed polymer, of open cell type, and the second core material is balsa wood, surface coated to reduce permeability.

6. A method according to claim 4, wherein the first core part and the second core part are made of the same type, and the surface of the first core part has a higher permeability to liquid polymer than that of the surface of the second core part.

7. A method according to claim 6, wherein the surface of the second core part has been coated with a substance closing at least some of the pores of the material at its surface.

8. A method of manufacturing a wind turbine blade by assembling two oblong shell parts manufactured according to claim 1.

9. An oblong shell part comprising a fibre-reinforced polymer material manufactured by means of an infusion process, whereby fibre material has been arranged in a mould cavity and subsequently impregnated with liquid polymer, wherein the oblong shell part comprises a plurality of fibre layers stacked to form a fibre insertion constituting a load carrying main laminate, extending in a longitudinal direction of the shell part, and at least one core element arranged along at least part of the fibre insertion, the at least one core element having a tapered edge section and comprising flow channels comprising hardened polymer, wherein the plurality of fibre layers forming the fibre insertion is stacked so that the tapered edge section of the at least one core element is wedged in between the fibre layers and thereby into the fibre insertion, wherein the stacked fibre layers and the flow channels of the at least one core element is at least partly filled with hardened polymer, characterised in that the at least one core element is composed by a first core part and a second core part arranged along each other in the longitudinal direction of the shell part so that the first core part is arranged between the second core part and a centre line of the fibre insertion, in that the first core part forms at least part of the tapered edge section of the core element, and in that a surface layer of the first core part has a higher content of hardened polymer taken up by pores of the surface layer than the content of hardened polymer of a surface layer of the second core part.

10. An oblong shell part according to claim 9, wherein the flow channels of the core element extends only in the second core part and not in the first core part.

11. An oblong shell part according to claim 9, wherein flow channels of the core element are formed between blocks forming at least part of the core element.

12. An oblong shell part according to claim 9, wherein the first core part is made of a first core material and the second core part is made of a second core material, wherein the first core material has a higher content of hardened polymer taken up by pores of the core material than the content of hardened polymer of the second core material.

13. An oblong shell part according to claim 12, wherein the first core material is foamed polymer, of open cell type, and the second core material is balsa wood, surface coated so that the content of hardened polymer taken up by the balsa wood is reduced.

14. An oblong shell part according to claim 9, wherein, when seen in a cross-section perpendicular to the longitudinal direction of the shell part, said cross-section being located at the position where the oblong shell part has its largest width, the width of the first core part is at least $1/20$, preferably at least $1/15$, and most preferred at least $1/12$ of the width of the second core part.

15. A wind turbine blade comprising two oblong shell parts according to claim 9.

* * * * *

UNITED STATES PATENT AND TRADEMARK OFFICE
CERTIFICATE OF CORRECTION

| | | |
|---|---|---|
| PATENT NO. | : 9,073,273 B2 | Page 1 of 1 |
| APPLICATION NO. | : 13/524893 | |
| DATED | : July 7, 2015 | |
| INVENTOR(S) | : Hanumantha Jois Guru Prasad | |

It is certified that error appears in the above-identified patent and that said Letters Patent is hereby corrected as shown below:

IN THE CLAIMS

Column 12, Lines 65-66: Please delete ", preferably at least 1/15, and most preferred at least 1/12"

Signed and Sealed this
Tenth Day of November, 2015

Michelle K. Lee
*Director of the United States Patent and Trademark Office*